July 9, 1940.                    C. O. FAIRCHILD                    2,207,343
                              RECORDING POTENTIOMETER
                   Filed Dec. 31, 1935              7 Sheets-Sheet 1

INVENTOR.
CHARLES O. FAIRCHILD
BY
ATTORNEYS

July 9, 1940. C. O. FAIRCHILD 2,207,343
RECORDING POTENTIOMETER
Filed Dec. 31, 1935 7 Sheets-Sheet 2

INVENTOR.
CHARLES O. FAIRCHILD
BY
ATTORNEYS

July 9, 1940.   C. O. FAIRCHILD   2,207,343
RECORDING POTENTIOMETER
Filed Dec. 31, 1935   7 Sheets-Sheet 3

Fig. 2.

INVENTOR
CHARLES O. FAIRCHILD
BY
ATTORNEYS

July 9, 1940.     C. O. FAIRCHILD     2,207,343
RECORDING POTENTIOMETER
Filed Dec. 31, 1935     7 Sheets-Sheet 4

INVENTOR
CHARLES O. FAIRCHILD
BY
ATTORNEYS

July 9, 1940.  C. O. FAIRCHILD  2,207,343
RECORDING POTENTIOMETER
Filed Dec. 31, 1935    7 Sheets-Sheet 5

INVENTOR.
CHARLES O. FAIRCHILD
BY
ATTORNEYS.

July 9, 1940.  C. O. FAIRCHILD  2,207,343
RECORDING POTENTIOMETER
Filed Dec. 31, 1935  7 Sheets-Sheet 6

INVENTOR
CHARLES O. FAIRCHILD
BY
ATTORNEYS

July 9, 1940.   C. O. FAIRCHILD   2,207,343
RECORDING POTENTIOMETER
Filed Dec. 31, 1935   7 Sheets-Sheet 7

INVENTOR.
CHARLES O. FAIRCHILD
BY
ATTORNEYS.

Patented July 9, 1940

2,207,343

UNITED STATES PATENT OFFICE 2,207,343

RECORDING POTENTIOMETER

Charles O. Fairchild, St. Albans, N. Y., assignor to Charles J. Tagliabue Mfg. Co., Brooklyn, N. Y., a corporation of New York Application December 31, 1935, Serial No. 56,880

14 Claims. (Cl. 234—5.5)

The present invention relates to measuring and recording instruments, particularly to devices of this kind employing a beam of radiant energy and an element sensitive thereto which are movable with respect to each other upon changes in a condition which is being recorded, and is an improvement on the mechanism disclosed in my United States Patent No. 1,970,559, dated August 21, 1934.

It is one of the objects of the invention to provide a mechanism of the type indicated which is characterized by a high degree of speed, sensitivity and accuracy combined with simplicity, ruggedness and compactness of structure and reliability of operation.

It is a further object of the invention to provide a recording mechanism of the type indicated which is capable of producing a large number of different records.

It is also an object of the invention to provide a recording mechanism wherein a large number of different records are produced in different colors upon one and the same chart and wherein the characteristics of the ink and the paper of the chart are so correlated that smudging of the record is prevented.

It is a still further object of the invention to provide mechanism for recording variations in the standard current of a recording potentiometer so that suitable correction for any fluctuations in such current can readily be made upon simple inspection of the chart. This improvement per se is claimed in a divisional application S. N. 273,118, filed on May 11, 1939.

Other objects of the invention are to provide a multiple recording mechanism in which the time between records is not arbitrarily fixed but is determined by the time required by the carriage to travel from one record to the next plus the time required for the operation of the recording and commutating mechanism, so that the time for measuring and recording is reduced; to provide a contact carriage driven by a reversible motor which is normally locked but is released upon starting and is stopped by a mechanism operated upon opening of the motor circuit to prevent over-run of the motor; to provide an easily adjustable drive for the chart of the instrument; to provide means operating automatically to cut in the next magnitude to be measured when any magnitude is outside the range of the instrument; and to provide an instrument in which all of the operating parts are mounted on a frame which can be swung out of the casing for inspection and servicing without interrupting the operation of the instrument.

Still other objects of the invention will appear in the description following.

While the invention, or various features thereof, are susceptible of many embodiments and adaptations in measuring, indicating, controlling and other devices, including recording instruments, I shall further describe the same by way of illustration in the form of a multiple-point recording potentiometer for measuring and recording, in succession, a number of variable magnitudes in the form of electrical potentials or capable of being converted into correspondingly varying electrical potentials, such as temperature, pressure, flow, light intensity, conductivity, etc.

On the accompanying drawings.

According to the embodiment of the invention about to be described, a number of magnitudes to be measured, in the form of electrical currents or voltages or converted into such quantities, are connected in succession with a measuring circuit in the form of a potentiometer, such circuit being then balanced against the quantity to be measured. The relation between the magnitude to be measured and the position of the potentiometer, that is, the condition of unbalance, is converted into deflections of a beam of light whose departures to the left or to the right of a normal or original position, and also the degree of departure, are sensed or detected by means of photosensitive means in association with a shutter mechanism. Associated with the shutter mechanism and prepared in synchronism with the movements of the latter, is an electrical system which effects movement of a potentiometer contact carriage and thereby brings the measuring circuit into balance.

When substantial balance is reached, the recording and commutating (or switching) mechanism is prepared and after such preparation is completed, the recording mechanism is operated to make a record of the measured magnitude upon a chart. At substantially the same time the commutating mechanism is operated so as to disconnect the source of the measured value and cut in the next value to be measured. The time between successive recordings is thus not constant but will be equal to the variable time required for the carriage to move from one position of recording to approximately the next position of recording, plus constant time interval required for the recording and commutating mechanisms to act.

*The measuring and balancing circuit*

Figure 1:
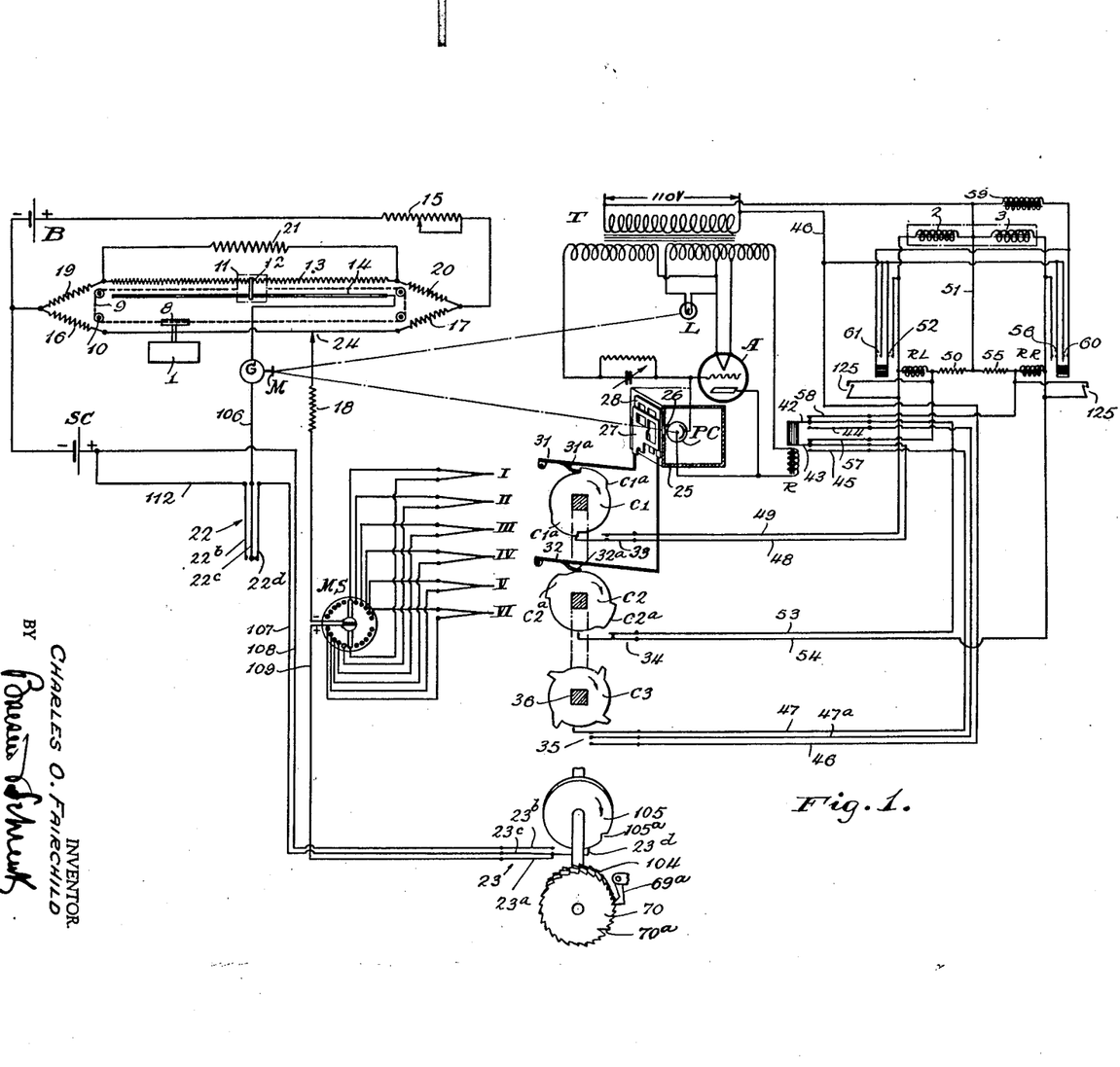
Fig. 1 is a diagram showing the electrical circuits embodied in a recording potentiometer, together with the associated timing mechanism.
Figure 2:
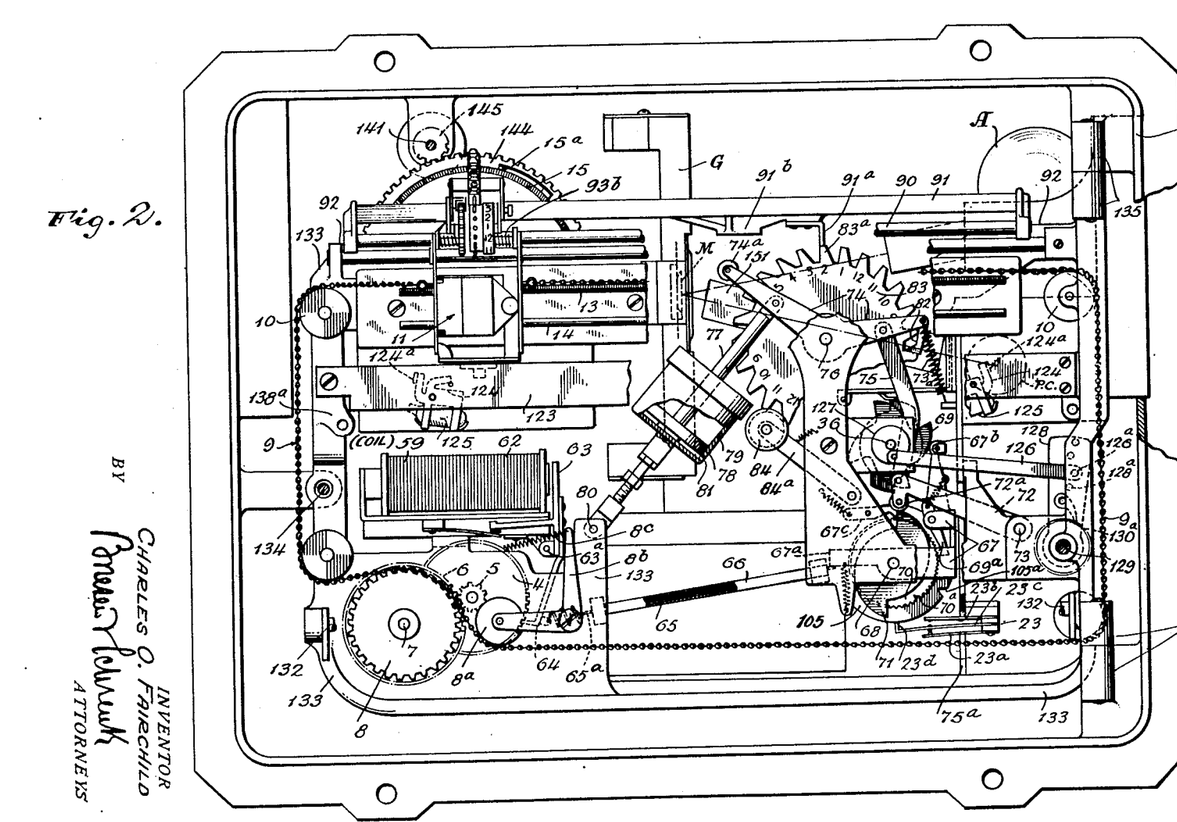
Fig. 2 shows a front view, in elevation, of a potentiometer, the door, chart-frame and other parts being omitted to show the operating mechanism more clearly.
Figure 9:
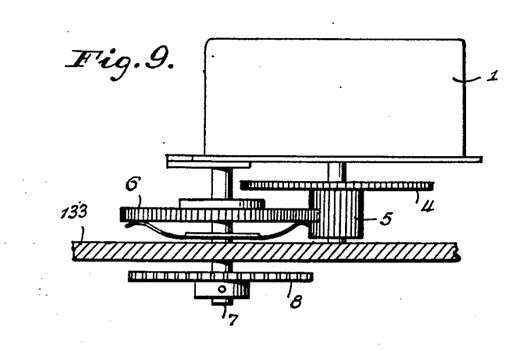
Fig. 9 is an enlarged plan view of the carriage driving motor and its gearing.

Referring now to Figs. 1 and 2, the circuits consist in part of the reversible motor 1 having two windings 2 and 3 adapted to drive it in a clockwise or counterclockwise direction and having a shaft equipped with a toothed wheel 4 (Figs. 2 and 9) and with a pinion 5 engaging a gear 6 on a shaft 7. The latter carries a sprocket 8 which in turn engages a chain 9 running on four pulleys 10 mounted upon the frame 133. The two ends of the chain are connected to a carriage 11 to move it from the right to left or from left to right, depending on which of the two windings 3 and 2 (Fig. 1) is respectively connected to the source of power. The chain is held in engagement with sprocket 8 by a roller 8a mounted upon a bell-crank lever 8b engaged by a spring 8c and pivoted upon the frame.

The carriage 11 is equipped with a sliding contact 12 (see Fig. 1) which cooperates with a slide wire 13 of a potentiometer and with a return bar 14 leading to the galvanometer G. The potentiometer measuring circuit consists, besides the slide wire 13, of a variable rheostat 15, the source of current B, and the resistors 16 and 17 forming a closed network with the rheostat 15 and battery B, the resistors being connected together and, through a resistor 18, to the multiple switch MS, the other ends being connected also to the other arms 19 and 20 which in turn are connected to the ends of the slide wire 13. The latter is shunted by a calibrating resistor 21. The resistors 20 and 17 are thus connected together and to the rheostat 15; and the resistors 16 and 19 are connected to each other and to the battery B and also to the standard cell SC which can be connected to the galvanometer G through series switches 22 and 23. The galvanometer can also be connected through these two switches to the multiple switch MS and by the latter to any one of, for example, twelve thermocouples, six of which are shown at I to VI (Fig. 1), and through the thermocouples and resistor 18 to an adjustable contact 24 to a lead of appreciable resistance between resistors 16 and 17.

A photoelectric cell PC is mounted within a housing 25 (Fig. 4) having a slot 26 behind shutters 27 and 28 through which light from the lamp L can be reflected from the mirror M of the galvanometer. The opening and closing of slot 26 are controlled by means of the shutters 27 and 28 which are slidably mounted in two tracks 29 and 30, Fig. 4, mounted on the front of the housing 25. By gravity the shutters tend to remain in the lower or open positions shown in Fig. 4, but they may be raised to closed position to obstruct the opening 26 by means of pivoted arms 31 and 32 (Figs. 1 and 3) which are actuated by cams C1 and C2 respectively. These two cams operate normally closed contacts 33 and 34, respectively, while a cam C3 operates normally open triple contacts 35. All three cams are mounted on the shaft 36 constantly driven by motor 37, Fig. 3. Contacts 33, 34 and 35 control a set of relays which in turn control the motor 1, as will be explained hereinbelow. The relays and the photoelectric cell are interconnected through an amplifying tube A.

Cams C1 and C2 are identical in shape but oriented 90° apart with respect to one another on shaft 36. Each cam C1 and C2 operates its associated shutter arm, shutter and contacts twice during each revolution, and is accordingly provided with two raised portions C1$^a$ or C2$^a$ which engage the tongue 31a or 32a attached to the arm 31 or 32. Cam C3 operates its contacts four times at equal intervals during each revolution. As will be explained below, the cams C1 and C2 respectively control the relays RL and RR respectively for the windings 2 and 3 of the motor.

The cams operate in the following order: C1, C3, C2, C3, C1, C3, C2, C3, etc. and, as will be set forth in greater detail, cause the performance of shutter and contact operations in the following sequence (the lower positions of the cams being the open and the raised position the closed condition of the shutters): 33 opens, 27 closes, 35 closes, 35 opens, 27 opens, 33 closes, 34 opens, 28 closes, 35 closes, 35 opens, 28 opens, 34 closes, 33 opens, 27 closes, etc.

Figure 1A:
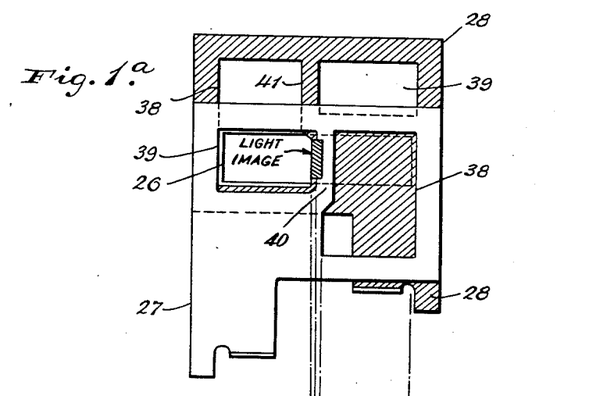
Fig. 1a shows the light control shutters which are associated with the photoelectrical cell.
Figure 1B:
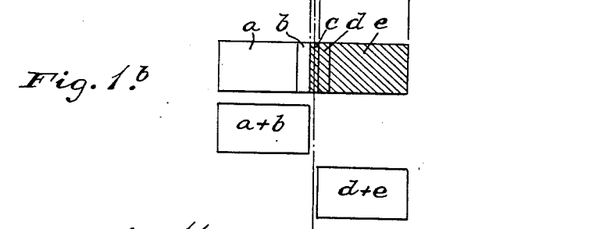
Fig. 1b illustrates graphically the different areas of exposure of the photoelectric cell during the cyclic operation of the shutters.

The manner in which the shutters and cam contacts, in co-operation with the photoelectric cell, light-beam and the set of relays control the action of the motor 1 and through it the contact 12, galvanometer G and the deflection of the light-beam reflected from mirror M, is best explained in connection with Figs. 1a and 1b. During the up and down movement of the shutters 27 and 28 the opening 26 in the photocell casing 25 through which light may reach the phototube is divided into sections a, b, c, d, and e. This division is accomplished by the contours and alternating motions of shutters 27 and 28. The shutters are mirrored images of each other and each shutter has openings 38 and 39 of different height and a projection or solid intermediate section 40 or 41 respectively. In the open, lower position of shutter 27 and the closed, upper position of shutter 28 shown in Fig. 1a, only sections a and b of opening 26 are exposed, c, d and e being blocked by shutter 28 as indicated by the shaded lines in Fig. 1b. When 28 opens (drops) projection 41 closes section b. Section c being closed by projections 40 and 41, only sections a and e are then open. When 27 now closes (on being raised), it will close sections a and b and open section d, section e remaining open through opening 39 of shutter 28. When 27 opens (drops), shutter 28 remaining open, it will close section d and open section a. Section c of the opening is at all times obstructed by the overlapping intermediate portions 40 and 41 of shutters 27 and 28, or if desired by a fixed narrow bar (not shown) in line with these portions.

The device functions in such a manner that when the mirror reflects light towards the section $c$ of the opening (indicating a balanced or predetermined condition in the potentiometer circuit), the motor 1 and therefore carriage 11 remain stationary. While light shines through section $a$ (the potentiometer circuit being then unbalanced), motor 1 is started to move the carriage 11 from left to right, and while light shines through section $e$, the carriage is moved from right to left. While light shines through $b$ or $d$ the carriage is moved to the right or to the left, respectively, but its motion is periodically interrupted. During the passage of light through $a$ and $e$, the motor runs continuously. The rotation of motor 1 and the resulting motion of carriage 11 operate automatically to balance the E. M. F. of one of the thermocouples with the potential difference between 24 and 12, and during the balancing the deflected galvanometer G is returned to a zero or "normal" position corresponding to its position on open circuit. Soon following such an automatic balancing operation, a record corresponding to the E. M. F. of this thermocouple is made and the multiple switch is then automatically rotated to connect the potentiometer circuit to the next thermocouple in sequence. These operations will be described in detail in later paragraphs.

Let us assume that the carriage 11 is in its farthest left-hand position and that the galvanometer mirror, M, reflects light through $a$, that the shutters are both open (down) and that contacts 33 and 34 are closed and contact 35 open. While light shines through $a$, the phototube PC is energized and causes, through the agency of the amplifying tube A, the closing of relay R. The amplifier A is supplied with current from the main line through the usual transformer T and operates in known manner. When the relay R closes, it connects contacts 42 and 43 to contacts 44 and 45 respectively. This has no immediate effect on the circuits. Shortly after cam C2 has opened contacts 34 and closed shutter 28 the cam C3 closes contacts 35. Since now the relay R and contacts 33 are closed, a circuit is closed through conductor 46, connected to one of the line wires, contacts 35, conductor 47, contacts 45 and 43, conductor 48, contacts 33, conductor 49 to the winding of relay RL and through it and the resistor 50 and conductor 51 to the other line wire. This closes relay RL and locks it through its contacts 52 which now connect RL and the winding 2 of the motor 1 to conductor 46 directly. Excitation of the winding 2 causes the motor to move the carriage from left to right.

Now while the carriage is moving from left to right continuously, cam C3 lets contact 35 open, while cam C2 lets the shutter 28 drop and contact 34 close. The closing of contact 34 has no effect on the relay RR at this moment because contacts 35 are open. Following this, cam C1 opens contacts 33, then closes shutter 27 which blocks off the light beam in area $a$ and causes relay R to open. Immediately after this, contacts 35 close momentarily but without effect because relay R is open. Contacts 33 now remain open until after cam C1 has permitted shutter 27 to open (drop), and do not close until after relay R has closed as a result of the light beam again shining into area $a$. If contacts 33 were allowed to remain closed while the shutter 27 was closed (no light in $a$), then the coil RL would have been short-circuited through the normally closed contacts 43 and 51 of the open relay R. The motor 1 is thus left running with current through coil 2 and the carriage continues to move from left to right during repeated operations of shutters 27 and 28 so long as the light beam is detected by the shutters in area $a$.

Similarly, while the light beam shines through $e$, current flows through winding 3, driving the motor 1 in the reverse direction and the carriage 11 from right to left. In this case relay R is closed while shutter 27 is closed and contacts 33 open. Under this condition the momentary closing of contacts 35 closes relay RR by closing a circuit from the line conductor through conductor 46, contacts 35, conductor 47a, contacts 44 and 42, conductor 53, contacts 34, conductor 54, coil RR, resistor 55 and through conductor 51 to the other line conductor. Relay RR is energized and closes a holding circuit by the closing of contacts 56 which connect the relay coil directly to conductor 46. The intermittent closing of contacts 35 while contacts 33 are closed is now without effect because these two sets of contacts are closed at the same instant only while cam C2 has closed shutter 28 and thereby caused opening of relay R, (the photo-cell being no longer excited) such action preventing the energizing of relay coil RL since contacts 43 and 45 are then open. It will thus be seen that the holding circuit for each relay RL and RR keeps such relay closed even while relay R is open, such relay R being open while the contacts 35 and the contacts 33 or 34 associated with the other relay are closed to prevent the other of the relays RL and RR from being energized while the light beam is in the original area $a$ or $e$.

When the carriage, in the example first discussed, has moved sufficiently to produce an approximate balance in the potentiometer or measuring circuit, the light beam moves from section $a$ to section $b$ of opening 26 and motor 1 (in the present exemplification of the invention) is periodically arrested, causing a step by step motion of carriage 11 from left to right; that is, a movement at a lower average speed. This is accomplished under the control of projection 41 on shutter 28. When cam C2 opens 34 and closes shutter 28, section $b$ of opening 26 is exposed, permitting light to shine on the phototube and closing relay R. Under this condition a momentary closing of contacts 35 as before closes relay RL and starts the motor 1 with current through coil 2. However, immediately following this, shutter 28 drops, blocking $b$, whereupon relay R opens and coil RL is short-circuited by the low resistance path through conductor 49, contacts 33, conductor 48, and contacts 43 and 57, whereupon the motor 1 is stopped. The motor does not start again until contacts 35 close while shutter 28 is closed (up) and the cycle is repeated. The carriage 11 will thus continue to move intermittently in its original direction toward the position of complete balance.

If the light falls on section $d$, carriage 11 is moved step by step from right to left in a manner which will be clear from the foregoing, contacts 58 and 42 of relay R being brought into play to effect short-circuiting of the relay RR after the carriage has moved for a short distance.

It will be seen, therefore, that as the mirror M approaches the position in which light is reflected in the direction of $c$ (which in the present case indicates that the IR drop in the effective portion of the slide wire equals the E. M. F. of the thermocouple), the rate at which carriage 11 progresses is materially reduced. During this period of step-by-step motion, operations associated with recording and commutating begin, as will be described later. When finally the light beam reaches section c the amount of light which can pass through opening 26 while the shutters are rising and falling is at no time sufficient to effect closing of relay R. It is not necessary that section c be large enough to block the entire area of the light beam but only such a fraction of it that relay R will remain open while the shutters operate. Thus neither of the relay coils RL and RR can be energized after the last short step which resulted in swinging the light beam out of area b or d into area c.

If during any cycle of cam operations the light beam swings slightly off the center of section c, resulting in sufficient current through relay R to close it, a short step will be taken by the carriage which will tend to return the light to the center or normal position.

Obviously the direction in which the carriage moves in response to the action of the shutters, cam contacts and relay R may be reversed by reversing the connections to the galvanometer or exchanging the connections of the relays RL and RR or motor coils 2 and 3.

While the amplifier A is illustrated as being operated by alternating current, it will be evident that a direct-current operated amplifier may be utilized where only direct current is available. In any case as many stages of amplification will be employed as is necessary to effect operation of relay R.

Recording and commutating mechanism

In a multiple point recording instrument, after each successive balancing of the measuring circuit against a variable E. M. F. or other magnitude to be measured, it is necessary to record the position of carriage 11 and to turn the commutating switch MS to disconnect such variable and connect in another variable. The apparatus whereby this is accomplished in cooperation with the balancing circuit described hereinabove is designed to perform the operations without unnecessary delay and at the same time reduce the possibility of a record being made while the light beam is momentarily in area c as the result of anything other than the attainment of truthful balance of the measuring circuit with the variable connected therewith. This apparatus will now be described.

Referring to Fig. 1, it will be seen that the electromagnetic coil 59 is connected to one of the line conductors and to contact sets 60 and 61 of relays RR and RL, respectively, so that when either one of these relays closes, coil 59 will be energized by connecting one end of it through the relay contact to conductor 46 running to the other line conductor. Thus, while motor 1 and carriage 11 are in continuous motion in either direction, coil 59 is continuously energized, and whenever motor 1 and carriage 11 take a short step in either direction, coil 59 is momentarily energized.

Referring now to Fig. 2, let us suppose that the carriage 11 is moving from its last balance point continuously toward the next one introduced by the commutating switch MS. Coil 59 of the electromagnet 62 will be energized and the armature 63, which is pivoted at 63a upon the frame, will be held against the core. Mounted on this armature is the dog 64 which will now be disengaged from the toothed wheel 4 mounted on the shaft of the moving motor 1. Attached to dog 64 is the rod 65, moving within the tube 66, which is now held under the extension 67a of the bifurcated arm 67 pivoted on shaft 68, see Fig. 10, thus holding this arm against counterclockwise rotation on its shaft. At this time, with the carriage moving continuously the light beam is found either in area a or in area e moving toward area b or d, respectively, as balancing of the potentiometer circuit or Wheatstone bridge is approached. When the carriage has reached a point corresponding to a swing of the light beam into b or d, it is stopped by the next fall of shutter 28 or 27, which shuts off the light, opening relay R and deenergizing whichever coil of motor 1 is driving it and also deenergizing coil 59. While the motor is thus momentarily stopped and electromagnet 62 momentarily deenergized, or while this condition persists during continued operation of the shutters and their cams and cam switches with the light beam in area c, rod 65 in moving to the left (Fig. 2) releases arm 67 so that its roller 67b will travel on the 4-point cam 69 mounted on the constantly rotating shaft 36. Thus arm 67 begins to oscillate when carriage 11 has approached near to a balance point corresponding to the swing of the light beam into areas b or d and finally into c. During each rise of roller 67b on a point of cam 69 the drive pawl 69a pivoted on the arm 67 rotates ratchet 70 on the shaft 68, stop pawl 67c preventing this ratchet from backing up. Rotating on the same bushing with ratchet 70 is the 2-point cam 71 upon which rides a roller 72a carried by the parallel arms 72 which are pivoted at 73 to the frame 133 of the instrument. Arm 72 is held in contact with cam 71 by the tension of spring 73a attached to one end of the two-armed lever 74, one of whose arms is connected to the arms 72 by the link 75. The other end of the spring is anchored to a beam forming part of the frame. The double armed lever 74 is rotated about its shaft 76 when roller 72a drops off a high point on cam 71 but is restrained from too rapid motion by the rod 77 attached to the other arm of lever 74 and carrying the piston 78 moving in a cylinder 79 attached adjustably upon and pivoted to the main frame of the instrument at 80. At the beginning of the oscillation of lever 74, the piston 78 starts from the bottom of cylinder 79 and draws in air through the small hole 81. During this stroke a drive pawl 82 pivoted on lever 74 turns the 24-tooth ratchet 83 one tooth forward (clockwise in Fig. 2), where it is held by stop roller 84 mounted on arm 84a which is pivoted upon the instrument frame and is urged toward the ratchet 83 by a suitable spring.

The ratchet 83 drives the commutating mechanism MS which includes a contact operating member composed of two spaced plates 85 (Fig. 3) on one bushing with the ratchet 83, and carrying insulator rollers 86 which in any one position force outwardly two opposite switch leaves 87, thus establishing contact with outer corresponding leaves 88. These two pairs of switch leaves 87 and 88 constitute two of the twenty-four poles of the multiple switch MS in its housing 89. Thus when arms 72 and 74 linked by 75 make one stroke, ratchet 83 and rollers 86 move one step in rotation, opening one and closing another pair of poles of the multiple switch MS.

When a pair of poles of the multiple switch closes, connecting the next thermocouple in succession, if the new E. M. F. to be measured differs materially from that of the previously connected thermocouple, the galvanometer G will be suddenly deflected so that the light beam reflected from the mirror M will suddenly swing into area a or area e of opening 26. This will result, at the next following closure of contacts 35, in the starting of motor 1 and energizing of the electromagnet 62, Fig. 2, as already explained. Thus, immediately following the drop of arm 72 and the step forward of the multiple switch MS, the commutating mechanism (and also the recording mechanism as will presently be described) will be held inoperative providing the E. M. F. of the thermocouple newly connected swings the light beam out of area c into areas a or e, the rod 65 then holding arm 67 against oscillation by the cam 69. However, if the new E. M. F. differs only a little from the last one measured, the light beam may swing but slightly into areas b or d, so that the motor 1 will start taking short steps, and there will be no halt in the operation of the recording and commutating mechanism. In such case the interval between records will be the time required for the to-and-fro motion of the arm 67 to drive ratchet 70, carrying on its bushing the cam 71, 180° to the next succeeding step of the multiple switch MS. It case the new E. M. F. is sufficiently different from the last one measured to throw the light beam into area a or area e, the interval between records will be the time required for the motor 1 to move the carriage 11 to a point on the slide wire 13 near enough to the balance point to reach the first short step occurring when the light beam first swings into area b or d, plus the time required for cam 71 to be rotated 180° by the then constant, uninterrupted motion of arm 67 travelling on cam 69. (The periodic energization of electromagnet 62 is ineffective to block the arm 67, as will be explained immediately below.) It will thus be seen that the time required for the recording of a complete cycle of variables connected to the multiple switch MS will not be fixed but will vary with the differences between the various values to be measured and recorded. It will also be readily apparent that it is possible by this method to record more rapidly, in general, than by using a fixed interval which must necessarily be sufficiently long to provide time for the carriage 11 to be driven all the way from one end of the scale to the other end. It is apparent also that the recording and commutating mechanism starts to operate following each approximation of a balance of the potentiometer, and that there is a limited time during which short steps can be taken to bring the carriage 11 to the exact balance point. If these short steps are all in one direction, as while the light beam is swinging slowly in area b or d, then since there are four points on cam 69 and two on cams C1 and C2, there will be one short step of the carriage 11 for each two teeth traversed (or oscillations) by pawl 69a on the ratchet 70.

It will be recognized that, while the electromagnet 62 is repeatedly energized when the light beam is in b or d and the carriage 11 is moving intermittently, the rod 65 must be made ineffective to block the extension 67a. This is accomplished by so relating the parts that while short steps are being taken by the carriage, the energizing of the electromagnet 62 occurs at those times in the cycles when the extension 67a is not in its uppermost position, but sufficiently below such position to prevent rod 65 from catching under it. To permit relative movement between the dog 64 and rod 65 under these conditions, a spring 65a is positioned between these parts, so that when rod 65 is driven to the right and strikes the end of arm 67a, the dog 64 can nevertheless move far enough counterclockwise to free itself from the toothed wheel 4.

The printing or recording mechanism

Figures 3, 10:
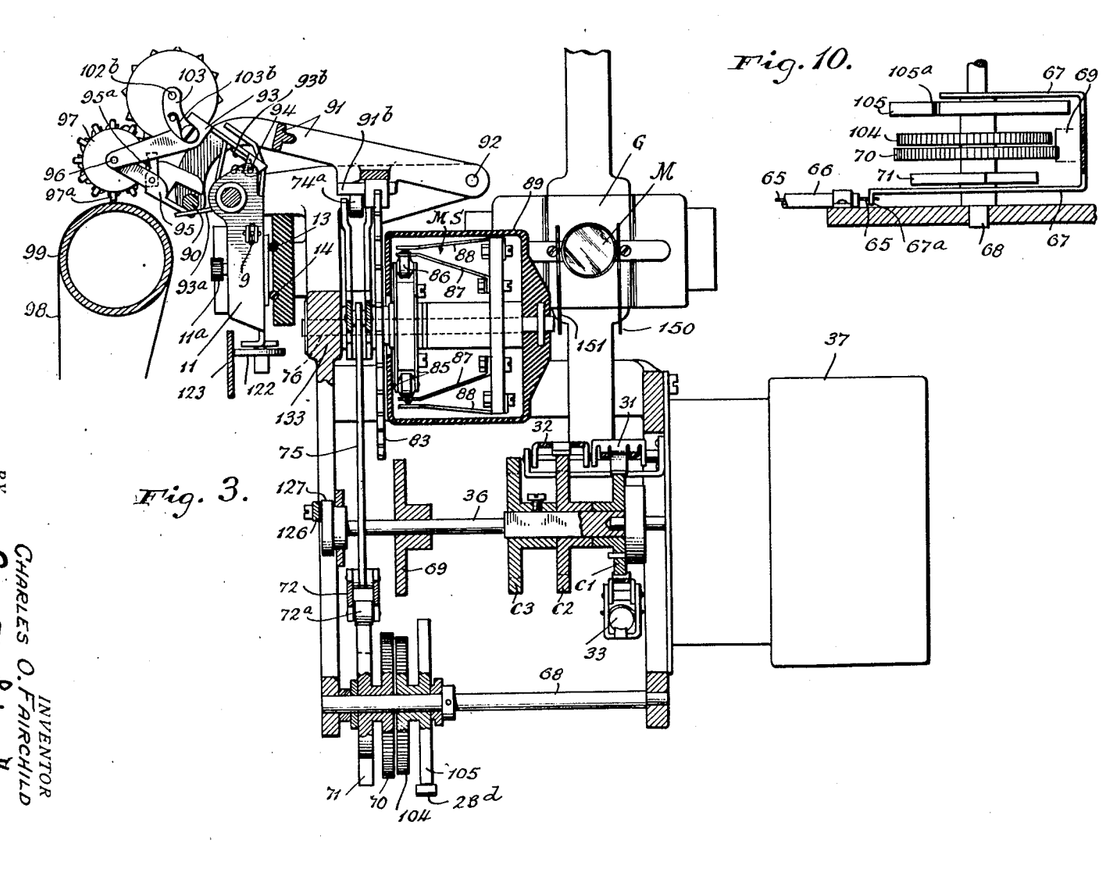
Fig. 3 represents a transverse section, on a slightly enlarged scale, through the mechanism shown in Fig. 2, looking from the right, and shows in particular the recording and commutating mechanism.
Fig. 10 shows a detail of the control device of the recording mechanism.
Figure 5:
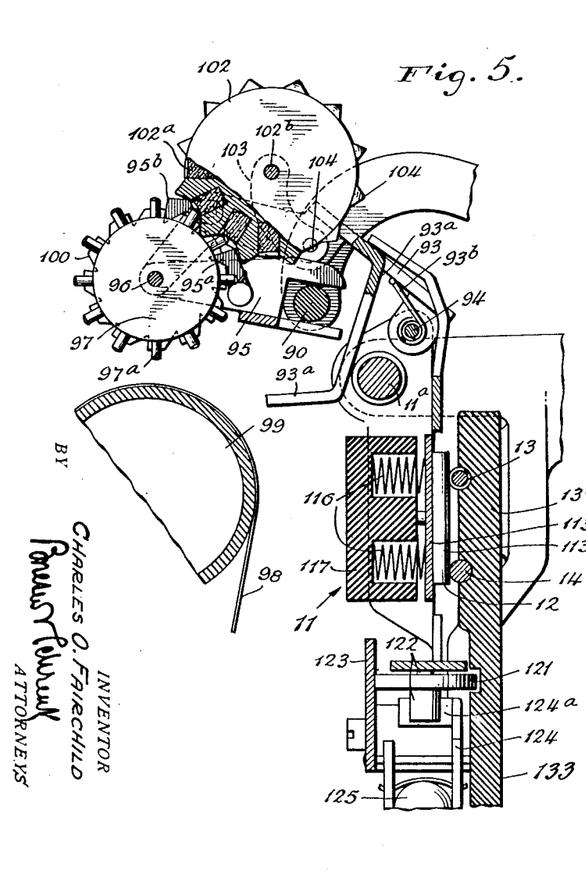
Fig. 5 is an enlarged view of the contact carriage and recording mechanism.
Figure 6:
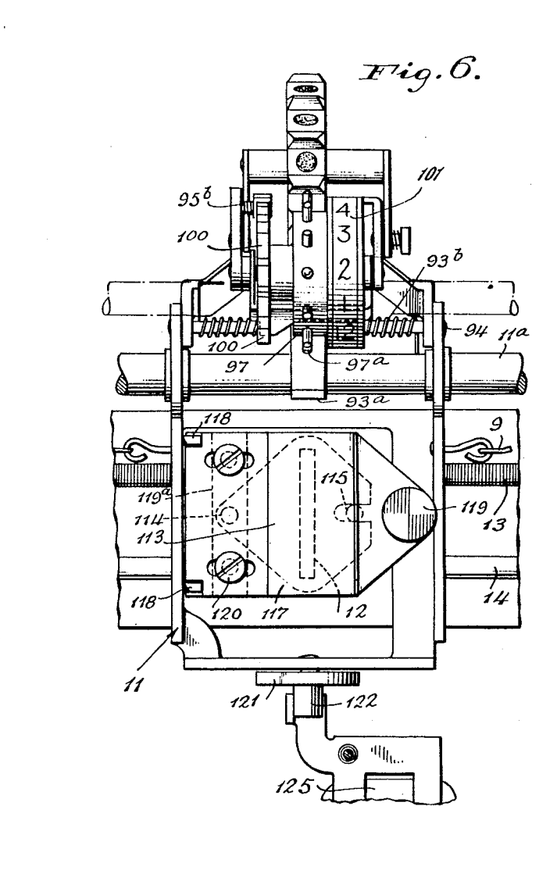
Fig. 6 is a front view of the structure shown in Fig. 5.

The recording of the position of the carriage at the balance point is accomplished by a multiple stylus which is brought into engagement with the chart by a depressor rod 90. In Fig. 3 the depressor rod is shown in its lowest position and in Figs. 2 and 5 in its highest position. The rod is supported by the frame 91 which is pivoted at 92 upon the frame 133 and is held in the raised position as shown in Fig. 2 by a lug 91a (Fig. 2) which extends downward and rides over the top of a tooth 83a of the ratchet 83. When a forward step of ratchet 83 begins, lug 91a and frame 91 fall to the lowest position, as shown in Fig. 3, and are raised during the same step by the roller 74a acting on the horizontal surface 91b of frame 91. This upward movement takes place more slowly because of the restraining action of the rod 77 connected to the air dashpot 78, 79. By its rise and fall, the frame 91 operates the multiple point printing mechanism 97 mounted on the carriage 11, in the following manner: When rod 90 falls it turns fork 95 (Fig. 3) about its axis 96 on frame 93, which is pivoted at 94 on the carriage, and finally strikes extension 93a of the frame 93. This action rotates frame 93 into its lower position shown in Fig. 3 against the lifting action of spring 93b, bringing a stylus 97a of stylus wheel 97 into contact with the paper chart 98 on the chart timing roll 99. Stylus 97a having ink on its tip, a record is printed upon the chart. Fork 95 carries a drive pawl 95a which, in the movement just described, has passed a tooth on the ratchet 100 (see Fig. 6), the latter being held from backing up on its shaft 96 by the holding pawl 95b (see Fig. 5), supported on frame 93.

As soon as rod 90 has reached its lowest position it starts to rise as previously explained (being lifted by the roller 74a), and in so doing it prepares the printing mechanism for the next record. As it rises, rod 90 carries fork 95 up with its pawl 95a which engages the ratchet tooth it has just passed, and ratchet 100 is turned one tooth, carrying with it the stylus wheel 97 and index wheel 101 (Fig. 6), with symbols corresponding to the styli, there being the same number of ratchet teeth, styli and symbols. The stylus tips engage, in the manner of gear teeth, the ink pads 102a in the molded wheel 102, each pad being impregnated with a proper ink of selected color. Hence the stylus tips are inked in rotation and at the end of the upward stroke of rod 90 the index wheel shows, when viewed from in front of the instrument, the symbol corresponding with the next record to be made by the stylus now pointing directly downward below the shaft 96. The ink wheel is supported on a shaft 102b, which is fastened to arms 103 pivoted at 104 on the frame 93, and is held in contact with the stylus wheel 97 by the spring 103b (Fig. 3).

During the upward stroke of rod 90, the frame 93 is raised by the coil spring 93b (Figs. 5 and 6) coiled upon the shaft 94 with one end pressing upwardly on 93 and the other held by the carriage 11. During this upward stroke, also, the lug 91a on frame 91 (Fig. 2) clears the next tooth of ratchet 83 which is rotating at this time and is held above this tooth until the down stroke of roller 74a and rod 90 begins (as roller 72a rides up on cam 71), when the lug rests upon the tooth for an interval until ratchet 83 makes the next stepwise movement.

The ink pads 102a are saturated with a nondrying ink, the pad having preferably inks of different colors, while the paper of the chart is relatively porous, so that the ink is quickly absorbed and danger of smudging of the record avoided. If desired, the chart paper may contain a suitable chemical which reacts with the ink and causes rapid drying thereof.

The motor operates the carriage through a slip or friction drive, (not shown) so that the carriage can be shifted by hand if necessary, and no damage will result if the movement of the carriage is blocked for any reason.

*Standard current measurement*

Once during each complete revolution of ratchet 70, see Figs. 2 and 3, the double pawl 69a drops into the deep tooth 70a and engages ratchet 104 which is smaller than ratchet 70 and is mounted on the same bushing with a cam 105 (Figs. 3 and 4), and a stroke of arm 67 carrying pawl 69a then rotates ratchet 104 one tooth forward together with cam 105. Cam 105 has one notch 105a and with each complete revolution of this cam the dog 23d (Fig. 2) on the center leaf 23c of switch 23 drops into notch 105a, causing leaf 23c to make contact with leaf 23b, thus connecting (see Fig. 1) the galvanometer G through conductor 106, switch 22, conductor 107, switch 23, conductor 108 to the standard cell SC. Thus the standard E. M. F. of the cell SC is substituted for a thermocouple E. M. F., the galvanometer G is deflected, unless perchance the carriage 11 is at the balance point, the light beam falls on the photocell, electromagnet 62 is energized, and rod 65 engages extension 67a on arm 67, preventing arm 67 from oscillating and rotating ratchet 70. Hence the cell SC is connected until carriage 11 travels to the balance point arbitrarily selected on the slide wire 13, whereupon electromagnet 62 is deenergized in the manner previously described, rod 65 is retracted and arm 67 with pawl 69 starts to drive ratchet 70. When ratchet 70 has made one-half revolution, so likewise has cam 71, and as previously explained this results in a record being printed on the chart. Since, now, the cell SC remains connected and the multiple switch disconnected because switch leaf 23c does not touch leaf 23a but still engages leaf 23b, the arm 67 continues to drive ratchet 70 the second half revolution. The recording mechanism is thus again actuated, and after a second record has been made at the same point, the pawl 69 drops into the deep tooth 70a, engages ratchet 104 and drives cam 105 a step forward, lifting the switch dog 23d out of the notch 105a in cam 105. This causes the switch 23 to disconnect cell SC and to cut in the multiple switch MS through conductor 109, switch 23, conductor 107, switch 22, conductor 106, to the galvanometer G. Thus another thermocouple is connected and the recording of temperatures proceeds until once again the notch in cam 105 reaches the switch dog 23d.

It will be apparent that these recurring connections to the standard cell SC result in a record upon the chart 98, as shown at 98a (Fig. 7) at relatively long intervals, for example one hour, of the value of the standard current in terms of the slide wire of the potentiometer, because the voltage of the coil SC is balanced with the potential drop in the slide wire from the contact 11 to resistor 19, plus the drop in 19. This record consists of two superimposed dots, in general offset from the temperature records, and can be interpreted by reading their position with reference to the standard scale 110, Fig. 7, which is graduated in percentage variation from the arbitrary "zero" point which, as illustrated, may be near the middle of the chart, and represents the correct value for the standard current. When the standard current record appears in register with the zero line, the current is correct. If the record is off zero, the temperature records can be corrected according to the percent figures appearing on scale 110. In standardizing the instrument, the current is changed by adjusting the rheostat 15, to such a value that the carriage travels to zero on scale 110 when switch 22 is operated by hand so that leaf 22c touches leaf 22b, connecting the galvanometer G through conductor 106, switch 22, and conductor 112 to the standard cell SC.

In one commercial form of the invention constructed by me the mechanism is so designed that the ratchet 70 makes a complete revolution every 30 seconds, such ratchet having 40 teeth and the ratchet 104 having 60 teeth. The standard current is measured once for every 120 records. The time between records is about 25–30 seconds, but obviously the instrument can be designed for different speeds of recording and for different numbers of separate records.

*Contact carriage details*

Besides the printing mechanism, the carriage 11 also carries the sliding contact 12, as already mentioned (see Figs. 5 and 6), the contact being mounted on a plate 113 held in position vertically and sidewise by a pivot pin 114 and a guide pin 115 entering an open slot in the plate 113. The contact 12 is pressed against the slide wire 13 and return wire 14 mounted in insulator plate 13a by springs 116 seated in cavities in the insulating block 117. The latter is held in position on the carriage 11 by pins 118 and the thumb screw 119. Pivot pin 114 is fast to a bar 119a which is adjustably fastened to the block 117 by screws 120 passing through elongated slots in the block. Also mounted on carriage 11 is a roller 121 turning on shaft 122, the roller being pressed by the reaction of springs 116 to bring roller 121 against a vertical track fastened to the frame 133.

It may sometimes happen that the potentiometer circuit is connected to a variable whose value is outside the range of the chart. In such event the carriage will travel to one or the other limit of its motion and remain thereat with the galvanometer unbalanced, so that the electromagnet 62 remains energized and restrains the oscillation of arms 67, thus halting the recording and commutating actions. The instrument thus far described accordingly would remain inoperative until this condition was detected by the attendant and the commutating mechanism would have to be rotated manually to cut in the next variable. Instead, in accordance with the invention, the operation is effected automatically in the following manner (Figs. 5 and 6):

The shaft 122 extends downwardly and at the right and left limits of travel of the carriage 11 engages a member 124a on a pivoted frame 124 which holds a mercury switch 125 (Fig. 1). When the carriage travels to the end of the scale and closes one of these switches, it short-circuits the coil of relay RL or RR, whichever one is closed, corresponding to the motion of the carriage toward the end it has reached. The short-circuiting of the relay coil opens the relay, stops the motor 1, which has been running against a friction drive, and also opens the electromagnet 62, permitting the commutating mechanism to turn the multiple switch to the next thermocouple.

Chart operating mechanism

Figure 4:
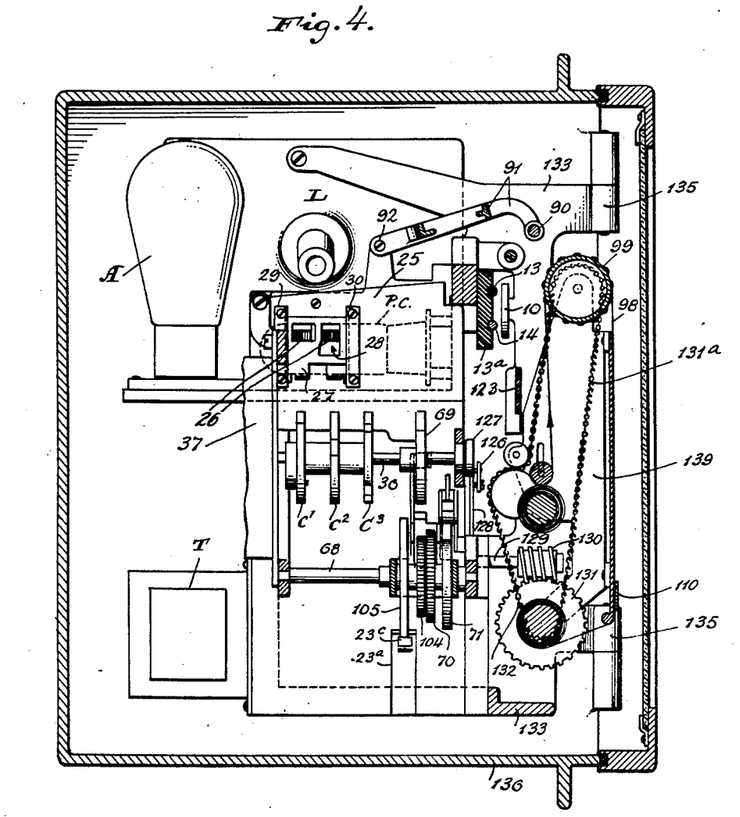
Fig. 4 is a transverse view through another portion of the instrument.

A link 126, Figs. 2 and 4, is connected eccentrically at one end to the disc 127 on continuously rotating shaft 36, and at the other end to the chart timing arm 128 by means of a shouldered screw 126a. The arm is provided with a plurality of openings 128a at different distances from the shaft 129 on which the arm is pivoted. By suitably selecting the point of connection between the link 126 and arm 128, the rate at which the chart will be driven can be varied.

As the arm 128 oscillates on the shaft 129 it drives a worm 130 (Fig. 4) by way of a pawl and ratchet 130a, and through this worm and a gear 131, it drives the chart timing roll 99 and chart 98 by means of a sprocket chain 131a in well-known manner.

Figure 7:
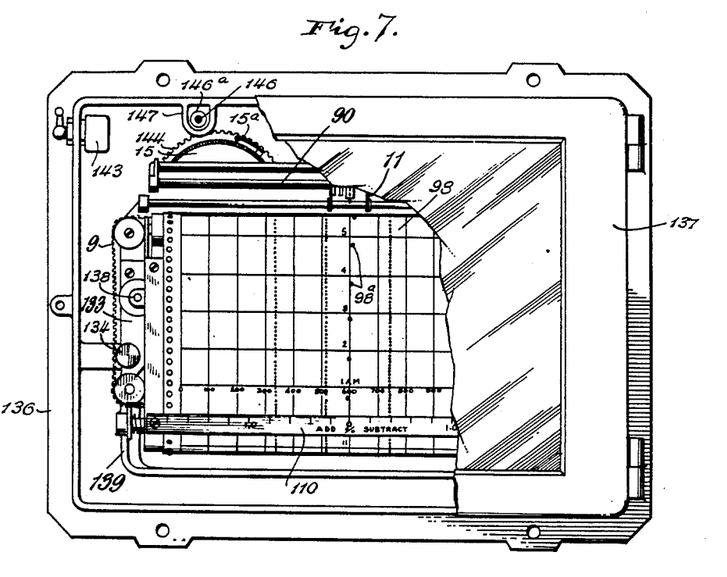
Fig. 7 is a front view of the instrument with the door partly broken away.
Figure 8:
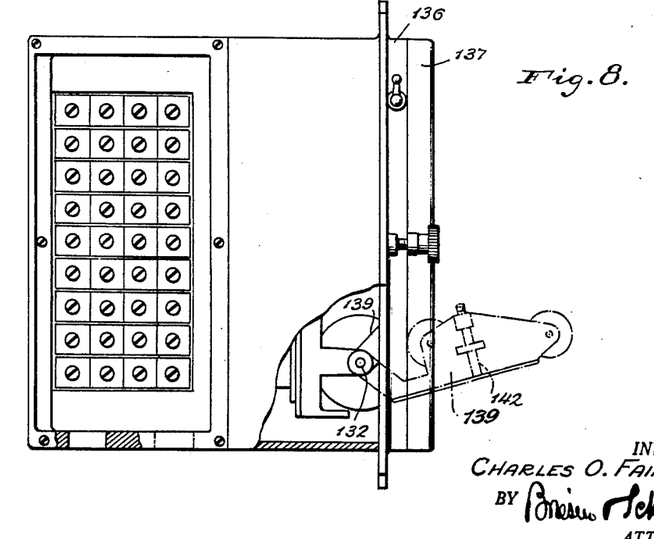
Fig. 8 is a side view, of the instrument, looking from the left, with the panel cover removed from the terminal compartment and the chart frame swung down.

As shown in Fig. 8, the chart mechanism consisting essentially of a frame 139 holding the roller 99 and the supply roll and reroll of the paper, may be swung down and forward upon the short end shafts 132. The mechanism is supported on the main frame 133 which is hinged at 135 (Fig. 4) to the casing 136 and fastened to the case by a thumb screw at 134 (Fig. 7).

Fig. 7 shows a general front view of the recorder with the windowed door 137 cut away to reveal one end of the entire mechanism, covered for the most part by the chart 98 whose frame 139 is held by thumb screws 138 (only one of which is shown), which engage lugs 138a (Fig. 2) on the main frame 133. There are also shown in Fig. 7 a main switch 143, the rheostat 15, with a contact 15a mounted on a gear 144 which is rotated by a pinion 145 (Fig. 2) on the rear end of shaft 141 carrying on its forward end a knurled head 146a which reaches through a hole in the door so that the rheostat can be adjusted without opening the instrument. The shaft 146 is mounted in a bracket 147 extending from the top of the casing.

It will be understood that suitable stops are provided to limit the oscillation of the galvanometer mirror so as to prevent the light beam from passing beyond the limits of the opening 26, as the carriage will not be operated under such conditions. It is, however, desirable that the stops be located as far apart angularly as possible to prevent the mirror from striking against them as a result of mechanical vibration. In accordance with a further development of the present invention (Fig. 11), I arrange the stops so far apart that the mirror is not caused to strike them by mechanical vibration and provide means for preventing the beam from passing beyond the limits of opening 26, even though such beam may be reflected from the galvanometer mirror in a direction which would normally carry it beyond the limits of the opening 26.

Figure 11:
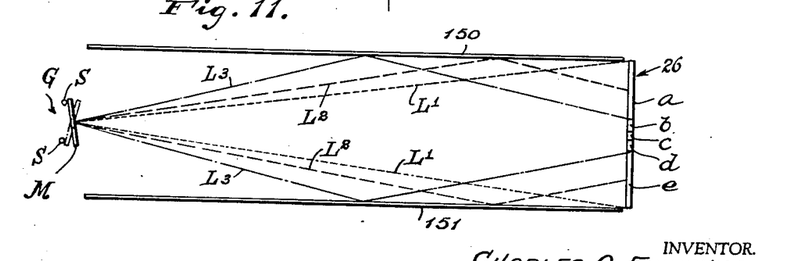
Fig. 11 shows a plan view of lateral mirrors for a galvanometer-deflected beam.

A suitable mechanism for accomplishing this end is illustrated in Fig. 11, wherein the reference characters G, M, a, b, c, d and e have the same significance as hereinabove. Ordinarily the limits of oscillation of the mirror M would be such that the light beam just reaches the outer limits of the areas a and e, as indicated at L1. In accordance with the present invention, the stops S are separated by a larger angle than is subtended by the opening 26, and there are arranged two reflectors 150 and 151 between the mirror M and the opening 26. These reflectors reflect into the area a or e any light beam, such as L2, which is projected from the mirror M beyond the outer limits of the opening 26. As it is undesirable that the beam be reflected into the areas b or d, since the contact carriage 11 would then travel slowly and a long time would be required to achieve balance (the carriage moving at first intermittently and subsequently moving continuously as the beam is projected directly into the area a or e by the mirror M without first striking 150 or 151, and then again intermittently as it enters the area b or d), the stops S are so disposed as to prevent the beam from being reflected by the reflector 150 or 151 into the area b or d. If desired, the mirror can be allowed a still larger amplitude of movement by suitably curving the portions of the reflectors 150 and 151, adjacent to the mirror M, to cause them to reflect the beam into the area a or e.

It will be obvious that if desired, only one of the reflectors 150 and 151 can be employed, the corresponding stop for the mirror M being then suitably positioned to prevent the beam from passing beyond that area a or e which is not provided with an adjacent reflector.

By omitting the electromagnet 62, the recording and commutating mechanism can be made independent of the balancing means and can therefore operate at regular intervals. In this way more frequent recording will be obtained. The electromagnet 62 can be readily disconnected and the commutating mechanism MS will switch from one thermocouple to the next, say every 15 seconds. The apparatus will thus have only 15 seconds in which to achieve balance.

It will be noted (Fig. 2) that all of the parts of the mechanism are mounted on the pivoted frame 133, so that the latter can be swung out of the casing to expose such parts without interrupting the operation of the instrument.

From the above it will be seen that I have provided a measuring and recording mechanism wherein the element movable in response to a condition of unbalance is an inertialess beam of light, so that extremely sensitive and accurate measurements can be made, while at the same time the mechanical construction of the instrument is greatly simplified.

It will be obvious that the use of the present invention is not limited to the recording of temperature through the E. M. F. generated by a thermocouple or by means of the change in resistance of a resistance thermometer connected to a Wheatstone bridge, but may be applied to the recording of any variable quantity which can, by any means whatever, be converted into electric current which is a measure of that variable.

It will be evident that certain novel features of the mechanism hereinabove described may be used without others and I propose to claim such features broadly without limitation to the specific organization disclosed.

I claim:

1. In a multiple recording instrument, the combination of a recording device movable over a recording chart, an electrical measuring circuit, means for connecting sources of variables to be measured with said circuit in rotation, mechanism associated with said circuit for effecting movement of said recording device, a switch located at a limit of travel of said recording device, and mechanism controlled by said switch for operating the connecting means to cause the next variable to be cut into the measuring circuit.

2. In a multiple point recording potentiometer, in combination, a potentiometric circuit including a contact movable to vary an electrical condition in said circuit and a galvanometer sensitive to conditions in said circuit; a motor for moving said contact; an element sensitive to light, a light source, means associated with the galvanometer for varying the direction of the beam from said source with reference to said element in accordance with variations in the electrical condition of the potentiometric circuit, mechanism operatively associated with said light-sensitive element to effect movement of the motor in one or the other direction as the beam is deflected to one or the other side of a normal position, said mechanism including a timing shaft and an electromagnet cyclically connectable thereby with said light-sensitive element; a multiple switch operable to connect said circuit with each of a number of sources of variables in succession; a drive for said multiple switch operated from said timing shaft, means actuated by the electromagnet according to the beam deflection relative to said light-sensitive element for controlling said drive; a marker associated with said movable contact; and mechanism driven from said timing shaft for operating said marker to record in sequence the successively measured variables.

3. In a multiple point recording potentiometer, the combination of a potentiometric circuit including a contact movable to vary an electrical condition in said circuit, a galvanometer sensitive to such electrical conditions in said circuit, and a multiple switch associated with said potentiometric circuit and adapted to sequentially connect said circuit with each of a number of sources of electrical variables to be recorded; recording mechanism moving with said contact; a motor for operating the contact; means governed by the galvanometer for controlling the motor to cause movement of the contact to a position establishing balance of said electrical conditions in the potentiometric circuit; means for operating the recording mechanism and multiple switch; mechanism adapted to prepare said operating means for relatively rapid actuation of the recording mechanism and switch when the galvanometer has reached the balanced position; a device for holding said preparing mechanism inactive as the contact moves toward a position of approximate balance; and mechanism governed by the galvanometer and operating when the galvanometer has reached approximate balance to actuate said device to cause said preparing mechanism to be set into motion as the contact continues to move toward the position of true balance.

4. In a multiple point recording potentiometer, the combination of a potentiometric circuit, a governing circuit in which an electrical condition is responsive to a measured variable condition in the potentiometric circuit, a horizontally movable carriage having a contact associated with said potentiometric circuit, means governed by said governing circuit condition for controlling the movement of the carriage in either of opposite directions to establish a predetermined condition in a portion of said potentiometric circuit by way of said contact, marker means, a frame supporting said marker means and pivotally mounted on the carriage, chart driving mechanism, a pivotally supported rod extending along the path travelled by the carriage and operable on said frame, and mechanism also governed by said governing circuit condition for effecting vertical reciprocation of said rod when said predetermined potentiometric circuit condition is reached to bring the marker means into contact with the chart.

5. In a multiple point recorder, a carriage movable in either of opposite directions, a marking mechanism moving with the carriage and operable to record upon a chart the value of a variable to be recorded, a measuring circuit connectable in succession with each of a plurality of sources of variables to be recorded, a contact on the carriage associated with the measuring circuit, a governing circuit responsive to said measuring circuit, a motor controlled by said governing circuit for moving the carriage, commutating mechanism for connecting the next succeeding source of a variable with the measuring circuit, operating mechanism for the marking mechanism and the commutating mechanism, and means governed by said governing circuit to act only during the movement of the carriage in the vicinity of the final position for recording for preparing the said operating mechanism for actuation of the marking and commutating mechanisms.

6. A multiple point recorder as set forth in claim 5, in which the last-named means includes holding means for normally holding the operating mechanism for the marking and commutating mechanisms inactive, and mechanism governed by said governing circuit to release said holding means when the carriage has reached a position adjacent to the position for recording.

7. In a multiple point recorder, a carriage movable in either of opposite directions, a marking mechanism moving with the carriage and operable to record upon a chart the value of a variable to be recorded, a measuring circuit connectable in succession with each of a plurality of sources of variables to be recorded, a governing circuit responsive to a condition of the measuring circuit, a motor for operating the carriage, commutating mechanism for connecting the next succeeding source of a variable with the measuring circuit, drives for the marking and commutating mechanisms, means governed by the governing circuit to control the motor to cause movement of the carriage continuously from the position of the last recording to approximately the position of the next recording, and means also governed by the governing circuit for setting said drives into operation when the carriage has reached said approximate position.

8. In a multiple point recorder, the combination set forth in claim 5, including a switch actuated by the carriage when it reaches the limit of the travel without the attainment of the recording condition in the measuring circuit, and mechanism controlled by said switch for causing the commutating mechanism to cut in the next source of a variable to be recorded.

9. In a multiple point recording potentiometer for measuring a variable then connected therewith, the combination of a potentiometric circuit, a carriage including a movable contact associated with the circuit, a recording mechanism movable with said contact, a governing circuit responsive to the departure from balance of the potentiometric circuit, means connected with said governing circuit and actuated in response to the variable to be measured to shift said contact to effect balancing of the potentiometric circuit, operating means governed by said measuring circuit to cause said recording mechanism to make a record when the potentiometric circuit has reached balance, commutating mechanism, means governed by said governing circuit to operate the commutating mechanism to connect the potentiometric circuit with the source of the next variable to be measured when the circuit has reached balance with the variable being measured, and switches in said governing circuit and operable by the carriage at the limits of movement of the contact to cause actuation of said recording and commutating mechanisms by way of said governing circuit.

10. A multiple point recording potentiometer comprising, in combination, a potentiometric circuit, a movable contact associated with the circuit, a carriage supporting said contact, a recording mechanism movable with the contact, a multiple switch for connecting the circuit in succession with each of a plurality of sources of variable E. M. F.s to be measured, means for moving the carriage in accordance with the value of the measured variable, mechanism for operating the recording mechanism to cause a record of the measured variable to be made upon a chart, and mechanism arranged to be set into operation by the carriage at its limits of movement to actuate the multiple switch and thereby cut in the source of the next variable to be measured, the potentiometric circuit being thus connected automatically to the next source of a variable when a variable being measured is outside the range of the instrument.

11. In a multiple point potentiometer, the combination of a potentiometric circuit, a governing circuit responsive to a condition of the potentiometric circuit, balancing means governed by said governing circuit for creating a balanced condition in said potentiometric circuit and including a carriage positionable over at least the operating range of the potentiometer, commutating mechanism adapted to connect the potentiometric circuit in succession with each of a number of sources of variables to be measured, means controlled by the governing circuit for operating the commutating mechanism, and switch means in said governing circuit operated by the balancing means carriage at the limits of the operating range of the potentiometer to cause said commutating mechanism to change to the next variable if the balancing means fails to establish substantial balance while the carriage is within the operating range of the potentiometer.

12. In an electrical recorder for values of a plurality of variable electrical quantities connectable in succession to its measuring circuit which has a movable contact and which recorder includes a recording mechanism having a marker and an actuating portion for moving said marker movable with said contact within operating limits across a chart, the combination of means sensitive to the difference between the measurement and the actual value of the connected variable, means governed by the sensitive means for moving the contact in a single step to a point near that corresponding with the value of the next variable immediately after the preceding variable has been recorded, means also governed by the sensitive means for operating the actuating portion of the recording mechanism as long as the measured circuit is approximately balanced as sensed by said sensitive means, the contact-moving means being operatively connected to the sensitive means to move the contact by a few short steps from such point to one corresponding with the exact value of the variable as sensed by said sensitive means and said means for operating the recording means being constructed to cause the recording means to record such exact value after the balanced condition as sensed by the sensitive means has been maintained for a total predetermined duration.

13. In an electrical recorder for values of a plurality of variable electrical quantities connectable in succession to its measuring circuit which has a movable contact and which recorder includes a marker and a recording mechanism having an actuating portion for moving the marker within operating limits across a chart, the combination of means sensitive to the difference between the measurement and the actual value of the connected variable, means governed by the sensitive means for moving the contact in a single step at substantially constant speed to a point near that corresponding with the value of the next variable immediately after the preceding variable has been recorded whereby the time required for such movement is proportional to the difference in the magnitudes of the two variables, and means also governed by the sensitive means for operating the actuating portion of the recording mechanism as long as the measuring circuit is approximately balanced as sensed by said sensitive means, the last named means being constructed to operate the recording mechanism to record such value after the balanced condition as sensed by the sensitive means has existed during a total predetermined duration even though the condition of approximate balance be interrupted.

14. In an instrument for recording on a chart the values of a plurality of variable physical quantities in succession and of a type in which the attainment of equality of measured and actual values of any of said variables depends upon the difference of such values, the combination of means for operatively connecting each variable in its turn to the measuring instrument, means sensitive to the difference between the measurement and the actual value of the connected variable, a marker means movable across the chart within its operating limits, a power means for moving said marker means from the preceding to the next measuring position thereof and a power means for causing the recording operation of said marker means and the operative connection of the next variable, and means having a cyclically-operative portion governed by the difference-sensitive means for controlling both of said power means, said last named means and both of said power means being operatively connected to cause the first named power means to move said marker means continuously at one speed when the sensitive means is unbalanced and cyclically at a lower average speed only when such means is only approximately balanced and to cause the second named power means to cyclically advance progressively at a fixed average speed as long as the sensitive means is at least approximately balanced and the marker means is within its operating range.

CHARLES O. FAIRCHILD.

CERTIFICATE OF CORRECTION.

Patent No. 2,207,343. July 9, 1940.

CHARLES O. FAIRCHILD.

It is hereby certified that error appears in the printed specification of the above numbered patent requiring correction as follows: Page 1, first column, line 8, for "1,970.559" read --1,970,559--; page 2, first column, line 21, after the word "plus" insert --a--; page 6, first column, lines 41 and 52, for "pawl 69" read --pawl 69a--; line 52, after the comma and before "the" insert --(see Fig. 1)--; line 55, after "23d" insert --(see Fig. 2)--; line 66, after the comma and before "as" insert --(see Fig. 7)--; and same line, strike out "(Fig.7)"; line 70, after "SC" insert --(see Fig. 1)--; line 73, for "two superimposed dots, in" read --two substantially superimposed dots of different colors, in--; and second column, line 45, for "roller being" read --carriage being--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.